(12) United States Patent
Klees et al.

(10) Patent No.: US 7,832,296 B2
(45) Date of Patent: Nov. 16, 2010

(54) STERILE SINGLE USE MEASUREMENT DEVICE

(75) Inventors: Daniel Klees, Greenwood, IN (US); Klaus Köhler, Müllheim (DE)

(73) Assignee: Endress + Hauser Conducta Gesellschaft fur Mess- und Regeltechnik mbH + Co. KG, Gerlingen (DE)

( * ) Notice: Subject to any disclaimer, the term of this patent is extended or adjusted under 35 U.S.C. 154(b) by 506 days.

(21) Appl. No.: 12/000,695

(22) Filed: Dec. 17, 2007

(65) Prior Publication Data
US 2009/0151482 A1 Jun. 18, 2009

(51) Int. Cl.
*G01D 21/00* (2006.01)
(52) U.S. Cl. ..................................... 73/866.5
(58) Field of Classification Search .................. None
See application file for complete search history.

(56) References Cited

U.S. PATENT DOCUMENTS

| | | | | |
|---|---|---|---|---|
| 2,981,108 | A * | 4/1961 | Andersen et al. | 374/150 |
| 4,863,281 | A * | 9/1989 | Suszynski | 374/158 |
| 5,743,647 | A * | 4/1998 | Chen | 374/151 |
| 6,572,265 | B1 * | 6/2003 | Gotthold et al. | 374/161 |
| 2008/0205481 | A1 * | 8/2008 | Faries et al. | 374/138 |

FOREIGN PATENT DOCUMENTS

| | | |
|---|---|---|
| DE | 10 2006 005 533 A1 | 8/2007 |
| WO | WO 2008/001091 | 1/2008 |

* cited by examiner

*Primary Examiner*—Robert R Raevis
(74) *Attorney, Agent, or Firm*—Bacon & Thomas, PLLC

(57) ABSTRACT

A sterile measurement device comprising an elongated measurement probe for measuring a physical property. The probe has a first end and a second end, and a sensing element, which is located on the first end which can be installed at any time on a measurement site. The measurement site has a measuring chamber for measuring a physical quantity inside the measuring chamber without breaching sterility of the measurement arrangement. The measurement device further comprising a sterile tubing comprising a first end, a second end and a compressible section located between the ends. The sterile tubing surrounding the probe, such that the second end of the probe extends out of the second end of the tubing, structure for establishing a sterile connection between the first end of the tubing and a corresponding counter part on a measurement site. The sterile connection forms a passageway leading into a measuring chamber, wherein the physical property is to be measured, and a thermal weld providing a seal between the second end of the tubing and the elongated probe; wherein the compressible section of the tubing allows for a length of the tubing to be varied, such that the sensing element is entirely located inside the tubing, when the compressible section is uncompressed, and the sensing element is located outside the first end of the tubing when the compressible section is compressed.

6 Claims, 3 Drawing Sheets

STERILE SINGLE USE MEASUREMENT DEVICE

TECHNICAL FIELD

The present invention concerns a sterile single use measurement device comprising a measurement probe having a sensing element for measuring a physical property.

BACKGROUND DISCUSSION

Such measurement devices are widely used in various branches of industry for example in the Pharmaceutical Industry, in Biotechnology, as well as in Medicine. They are for example used for measurements of physical properties of products processed in bioreactors in Life Science Industry.

There is a wide range of physical properties that need to be measured or monitored in these application, including for example a temperature of a product, a conductivity of a product, or analytical properties of a product, such as a pH value, an Oxygen content, an oxidation reduction potential or a content of a specific ion. These physical properties are typically measured using commercially available measurement probes comprising corresponding sensing elements. During measurement, the probe is inserted into a measurement chamber containing the product and the physical property is measured.

In these branches of industry very high standards of hygiene are required. These standards may vary slightly from country to country, but in general they require that any surfaces of the measurement arrangement which may come in contact with the product can be effectively cleaned and/or sterilized.

In conventional measurement arrangements of this type, e.g. in bioreactors, closed systems are used. They comprise stainless steel vessels and the measurement probes are inserted through metal ports into these vessels. The closed system is sterilized by hot steam or chemicals for a period of time to assure that all living organisms are inactivated. The bioreactor is then cooled, dried and charged for example with media, cells, nutrients and gasses and the bioreaction is started. Since the measurement probe was sterilized with the initial sterilization cycle of the measurement arrangement, the probe coming into contact with the bioreaction media through the sidewall of the bioreactor is sterile. Electronic signals from the measurement probe are for example used to precisely control the physical property measured therewith.

In order to avoid the time and costs involved in sterilizing the closed system these Industries may prefer to use pre-sterilized disposable measurement arrangements comprising disposable containers and disposable measurement devices.

The main advantage of disposable measurement arrangements is, that cleaning and sterilization of the equipment is no longer necessary at the site where the Pharmaceutical, Biotech or Medical processing takes place. Disposable, pre-sterilized components and systems can be kept in stock. This allows for a great time efficiency, especially when production lines need to be set up, enlarged or scaled down frequently.

Today, there is a wide range of disposable containers on the market. They are for example manufactured by companies such as HyClone, Logan, Utah, USA or Sartorius BBI Systems GmbH, Germany. Disposable single use containers usually comprise a large flexible bag with sterile connections for the attachment of tubing. The empty disposable containers are typically sterilized with gamma radiation and delivered to the customer. The customer attaches sterile tubing to the container via the sterile connections which allow for the pre-sterilized components to be connected together without breaching sterility of the system or individual components.

There are many types of sterile connectors on the market. They allow for two separate sterile elements to be connected without breaching sterility. The elements are for example disposable tubes, pipes or containers each comprising means for a sterile connection. The elements to be connected are sterilized at the suppliers facilities and the sterile connections prevent breach of sterility of the sterile elements during shipment and storage of the sterile elements.

One commonly used type of sterile connector is for example sold by Pall Corporation, New York, USA under the trade name Kleenpak®.

These single use connectors allow for a dry connection of two separate fluid pathways, while maintaining the sterile integrity of both. The connection is made by a male connector located on the first element and a female counter connector located on the second element to be connected. Each connector is covered by a vented peel away strip that protects the port and maintains the sterility of the sterile pathway inside the respective elements. The two elements are connected by aligning the connector and the counter connector such that the peel away strips are facing each other. In a next step the connector and the counter connector are interconnected, for example snapped together. At this stage, the two peel away strips are pressed against each other between the two connectors. They both comprise an end section, which extends outside the two connectors. The two peel away strips sealing the passageway are removed simultaneously by pulling them out by their end sections. By removing these seals simultaneously, the passageway is cleared without breaching the sterility of the interior of the two elements to be connected and of the passageway connecting them.

Another type of sterile connections is promoted by Wave Biotech, which is part of GE Healthcare Bioscience Bio Process Corporation, New Jersey, USA. In this type of connection, the two elements to be connected together have a tubular shape. The end of each tubular element is thermally welded closed and both elements are sterilized. Both elements to be joined together are inserted into a holder such that their ends overlap. A sterile hot blade or knife is inserted into the holder and cuts through both elements, thus cutting of the overlapping sealed ends. Then the tubular elements are realigned inside the holder and pushed together to engage in a sealed sterile connection.

In order to measure physical properties of a medium inside a measurement chamber, it is possible, to pre-install corresponding measurement probes on disposable measurement arrangements, for example on disposable containers of the type mentioned above, and to sterilize the measurement probe together with the container using gamma radiation.

This requires however, that the entire measurement arrangement is pre-assembled and sterilized prior to its use. All the required measurement probes need to be known and provided beforehand. In many applications however, it is necessary to respond quickly and efficiently to changing needs. This is not possible when pre-assembled measurement arrangement are use. They cannot for example be adapted to changing measurement requirements. Once the measurement arrangement has been sterilized, it is not possible to change or add measurement probes without breaching sterility of the arrangement.

SUMMARY OF THE INVENTION

It is an object of the invention to provide a sterile measurement device comprising a measurement probe for measuring a physical quantity which can be installed at any time on a measurement site comprising a measuring chamber for measuring a physical quantity inside the measuring chamber without breaching sterility of the measurement arrangement.

To this end the invention comprises a sterile single use measurement device comprising:

an elongated measurement probe comprising a first end and a second end, a sensing element for measuring a physical property, which is located on a first end of said probe, a sterile tubing comprising a first end, a second end and a compressible section located between said ends, said tubing surrounding said probe, such that said second end of the probe extends out of said second of said tubing, means for establishing a sterile connection between said first end of the tubing and a corresponding counter part on a measurement site, wherein said sterile connection forms a passageway leading into a measuring chamber on said measurement site, wherein said physical property is to be measured, a thermal weld providing a sealed mechanical connection between said second end of said tubing and said elongated probe; wherein said compressible section of said tubing allows for a length of said tubing to be varied, such that said sensing element is entirely located inside said tubing, when said compressible section is uncompressed, and said sensing element is located outside said first end of said tubing when said compressible section is compressed.

According to a preferred embodiment, means are foreseen for holding said compressible section in a compressed state after it has been compressed. These means comprise for example a retaining fixture, to be attached to an outside of said compressed compressible section.

According to a preferred embodiment, said compressible section comprises bellows formed into said tubing.

According to a preferred embodiment, said means for establishing a sterile connection between said first end of the tubing and said corresponding counter part on said measurement site comprise a sterile seal sealing off an inside of said tubing, whilst said sensing element is entirely located inside said tubing before said sterile connection is made.

The invention further comprises a method of installing a sterile single use measurement device according to the invention on a measurement site comprising the steps of:

mounting said device on said measurement site via said sterile connection, and transferring said sensing element into said measurement chamber by compressing said compressible section of said tubing.

The sterile single use measurement device according to the invention can be connected to any type of sterile single use measurement arrangement via the sterile connection. This can be done at any time required, without breaching the sterility of the arrangement. It is for example feasible to keep various disposable containers comprising means for sterile connections in stock and to equip them with the measurement devices needed for a specific measurement task to be performed at any time. This modular set up allows for a very flexible and efficient way to respond to quickly changing measurement needs, especially, when production sites need to be scaled up and down quickly, or when it is not always possible to know in advance which types of physical quantities will need to be measured or monitored in future applications.

Also, it is no longer necessary to keep a large variety of custom made measurement arrangements with built in measurement probes in stock in order to quickly fulfill numerous different process and measurement requirements.

The invention and further advantages are explained in more detail using the figures of the drawing, in which two exemplary embodiment are shown. The same reference numerals refer to the same elements throughout the figures.

DETAILED DESCRIPTION OF THE DRAWINGS

Figure 1:
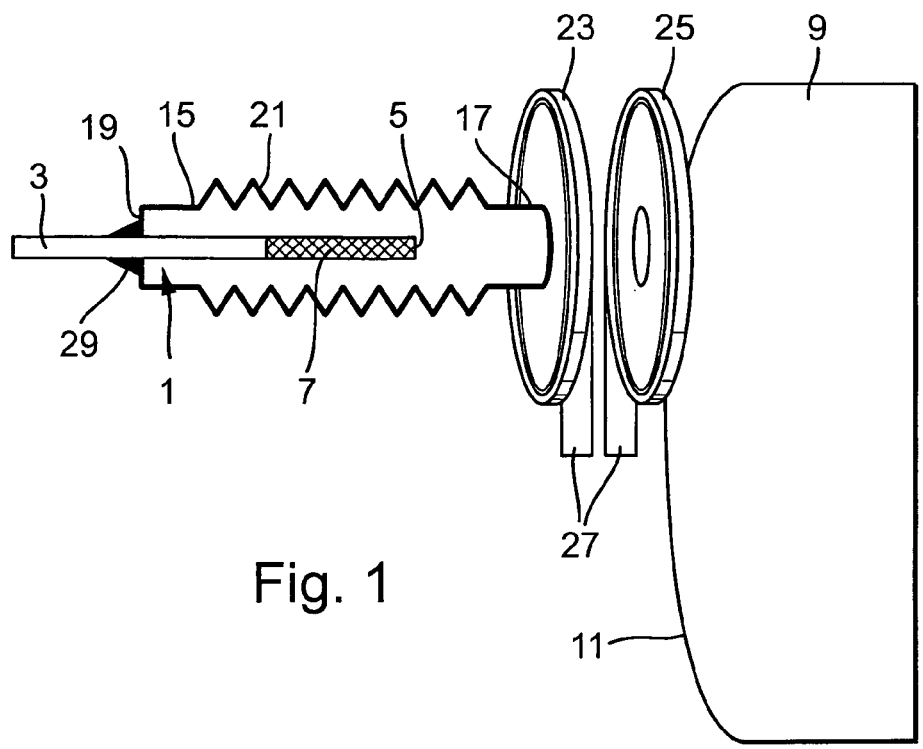
FIG. 1 shows a measurement device according to the invention and a measurement site comprising a disposable container.

FIG. 1 shows a sterile single use measurement device according to the invention. It comprises an elongated measurement probe 1 comprising a first end 3 and a second end 5. A sensing element 7 for measuring a physical property is located on the first end 3 of the measurement probe 1.

The measurement probe 1 is for example a probe for measuring a temperature of a product, a conductivity of a product, or an analytical property of a product, such as a pH value, an Oxygen content, an oxidation reduction potential or a content of a specific ion. Such probes are available on the market. A large variety of such probes is for example sold by the applicant. During measurement, the sensing element 7 of the probe 1 is inserted in a measurement chamber 9 containing the product to be measured. The measurement probe 1 measures the physical property and provides an electric output signal representing the measurement result. To this extend the probe 1 can for example be a compact device comprising a measurement electronic for producing the output signal or the measurement probe can be connected to an external measurement electronic. In the later case, the sensing element 7 produces an electrical signal representing the physical property to be measured and the external measurement electronic derives the electric output signal representing the measurement result based on the electrical signal produced by the sensing element 7.

The measuring chamber 9 can be an inner chamber of any type of disposable container, vessel or tubing which is suitable to the industrial process to be performed.

In the embodiment shown in FIG. 1 the measurement chamber 9 is an inner chamber of a disposable container 11. Such disposable single use containers are for example manufactured by companies such as HyClone, Logan, Utah, USA or Sartorius BBI Systems GmbH, Germany. Disposable single use containers usually comprise a large flexible bag with sterile connections for the attachment of tubing.

Figure 2:
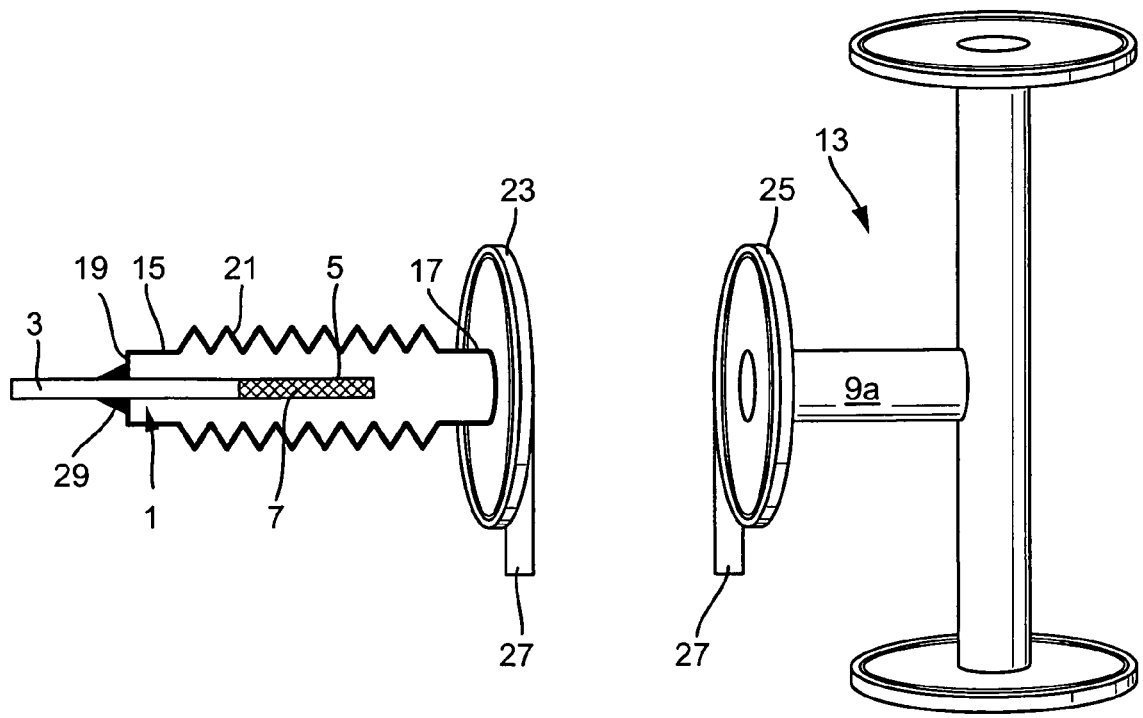
FIG. 2 shows the measurement device and a measurement site comprising a T-shaped tubing.

FIG. 2 shows an alternative embodiment, wherein the measurement device is mounted on a T-shaped tubing 13. Here the measurement chamber 9a is formed by an inner chamber of the T- shaped tubing 13. The invention is not limited to T-shaped tubing. Other types of tubing having an accessible interior which is big enough for the insertion of the sensing element 7 of the probe 1 can be used.

Figure 3:
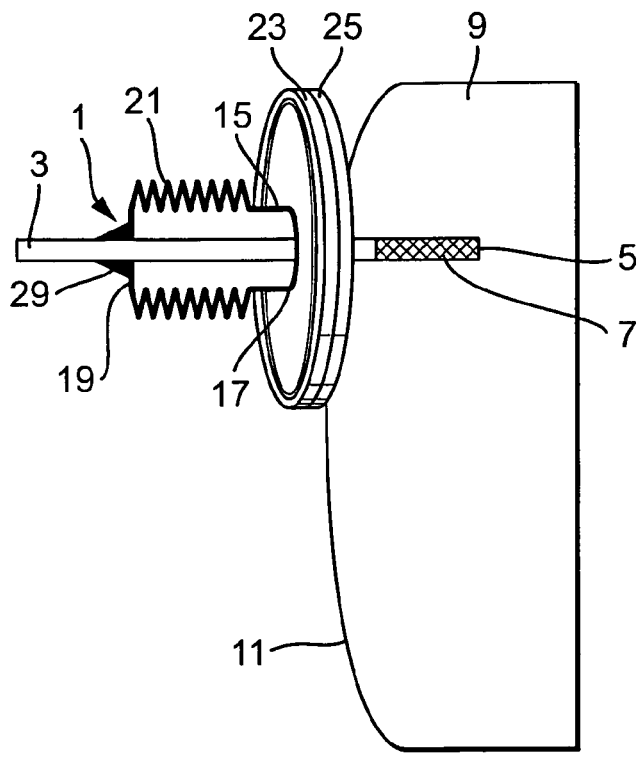
FIG. 3 shows the measurement device connected to the disposable container via a sterile connection.
Figure 4:
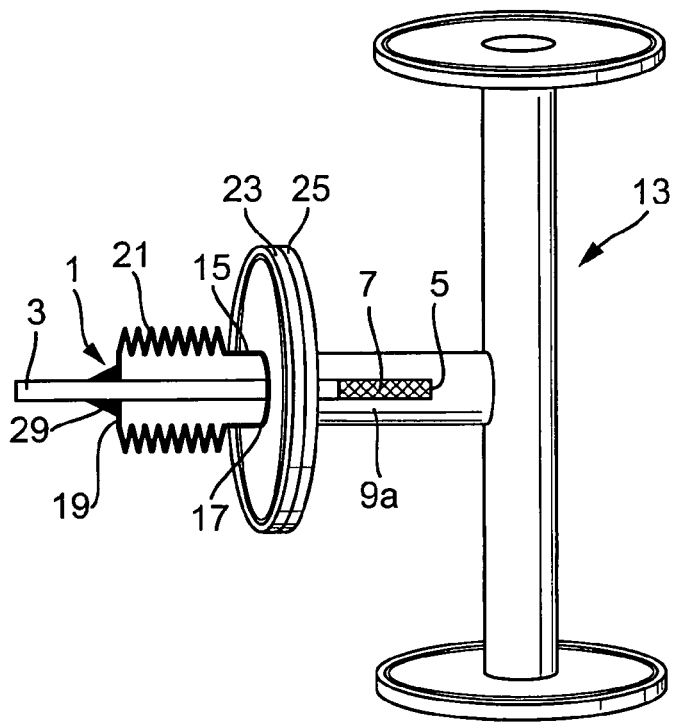
FIG. 4 shows the measurement device connected to the T-shaped tubing via a sterile connection.

The measurement device comprises a sterile tubing 15 comprising a first end 17 and a second end 19 and a compressible section 21, which is located between the ends 17, 19. The tubing 15 co-axially surrounds the measurement probe 1. The compressible section 21 of the tubing 15 allows for a length of the tubing 15 to be varied, such that the sensing element 7 is entirely located inside the tubing 15, when the compressible section 21 is uncompressed, as shown in FIGS. 1 and 2, and that sensing element 7 is located outside the first end 17 of the tubing 15 when the compressible section 21 is compressed, as shown in FIGS. 3 and 4. In the embodiment shown, the compressible section 21 comprises bellows formed into said tubing 15 which allow for the tubing 15 to be compressed in axial direction. Prior to the installation of the measurement device on the measurement site, the compressible section 21 is uncompressed and the sensing element 7 is entirely located within the tubing 15.

On the first end 17 of the tubing 15 means 23 are provided for establishing a sterile connection between the first end 17 of the tubing 15 and a corresponding counter part 25 on the measurement site leading into the measurement chamber 9. Seals 27 are foreseen on the means 23 and their counterpart 25 sealing of the inside of tubing 15 and the measurement chamber 9. When the sterile connection is made, the seals 27 are removed and the means 23 and their counterpart 25 form a passageway into the measuring chamber 9, wherein the physical property is to be measured.

Sterile connections are known in the art and therefore not described in detail here. In the embodiment shown in FIG. 1, a sterile connection of the previously described type presently sold by Pall Corporation, New York, USA under the trade name Kleenpak is shown. Here the means 23 on the tubing 15 and the corresponding counter part 25 on the measurement site are male and female connectors. Each connector is covered by a sterile barrier. The sterile barriers form the seals 27 and maintain the sterility of the insides of the connectors, the tubing 15 and the measuring chamber 9.

Alternatively a sterile connection of the type promoted by Wave Biotech, which is part of GE Healthcare Bioscience Bio Process Corporation, New Jersey, USA can be used. In that case the means for establishing the sterile connection on the tubing 15 would comprise a tubular end, which is for example thermally welded closed. The corresponding counterpart on the measurement site would be a tubular element, which forms a passageway into the measurement chamber, having an outside end, that is thermally welded closed. In this case, the closed ends of the tubular end of the tubing 15 and the tubular element form the seals 27 and maintain the sterility of the insides of the connectors, the tubing 15 and the measuring chamber 9.

On the opposing second end 19 of the tubing 15, a thermal weld 29 is foreseen between the tubing 15 and the probe 1 providing a sealed mechanical connection between said second end 19 of the tubing 15 and the probe 1. This thermal weld 29 entirely closes and permanently seals the area where the second end 3 of the probe 1 extends out of the tubing 15.

Once the probe 1 is inserted inside the tubing 15 and entirely closed off on both ends 17 and 19 by the thermal weld 29 and the means 23 for making the sterile connection, the entire measurement device is sterilized, for example by gamma radiation. The measurement device is now ready for use and can be installed any time on any measurement site comprising the measuring chamber 9 wherein the physical quantity is to be measured without breaching sterility when the components are connected together.

The measurement device is installed on site by physically mounting the device on site via the sterile connection. The way this sterile connection is made depends on the type of sterile connection used and is already described above. Upon making the sterile connection, the seals 27 are removed, such that a passageway exists connecting the interior of the tubing 15 to the interior of the measurement chamber 9. In a next step, the sterile sensing element 7 is inserted into the measurement chamber 9 by compressing the compressible section 21 of the tubing 15. This step can for example be performed by exerting a force along a longitudinal axis of the probe 1 directed towards the measurement chamber 9. To this extend, the probe 1 is held on its second end 3 and pushed forward, until the sensing element 7 reaches through the passageway into the measurement chamber 9, as shown in FIGS. 3 and 4. Since the probe 1 is mechanically connected to the tubing 15 via the thermal weld 29, the compressible section 21 is compressed by this movement of the probe 1. Compression of the compressible section 21 of the tubing 15 reduces the volume inside the measurement device and minimizes product hold-up inside the device.

Figure 5:
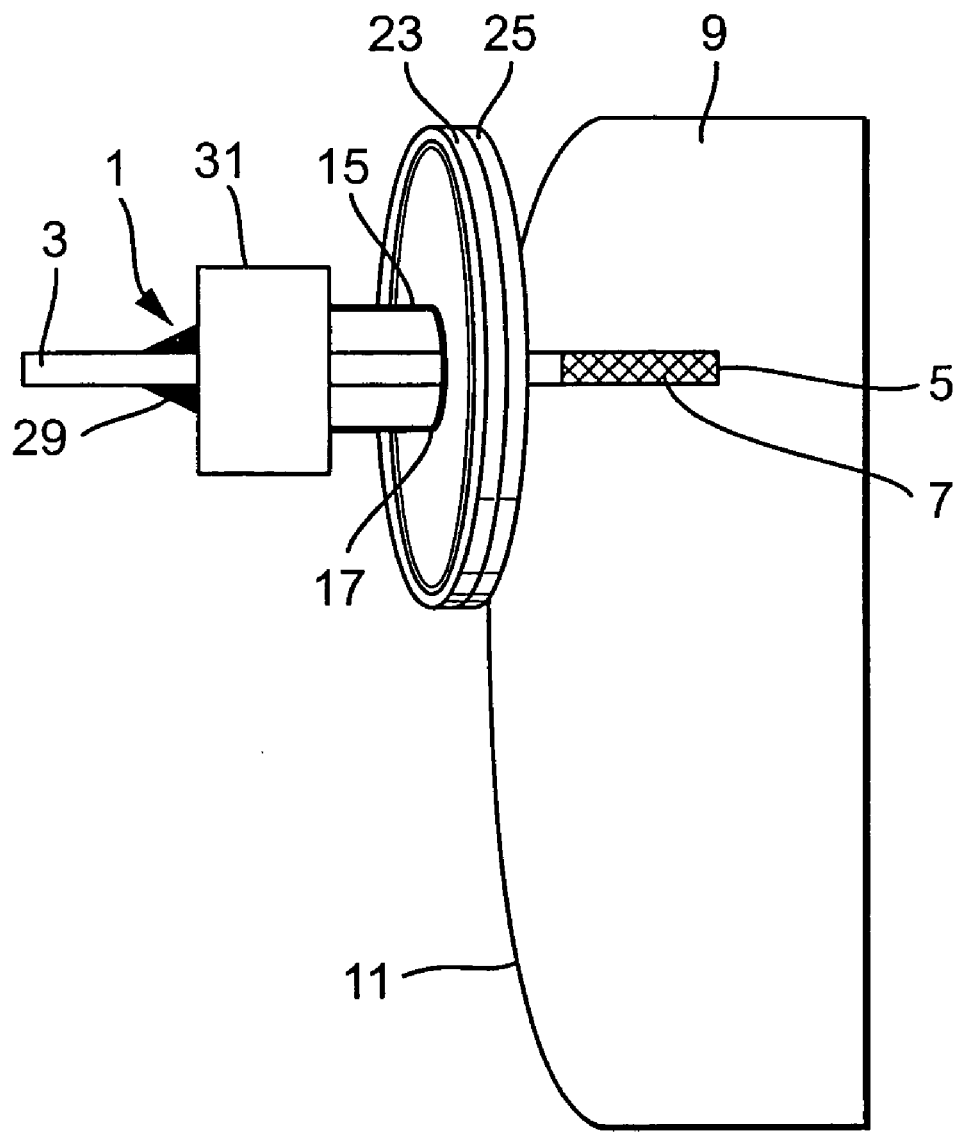
FIG. 5 shows the measurement arrangement of FIG. 3, wherein the compressible section of the tubing is held in a compressed state by a retaining fixture.

Preferably, means 31 are foreseen, for holding said compressible section 21 in its compressed state after it has been compressed. These means 31 are for example a retaining fixture, for example a Velcro strap, which is to be attached to an outside of the compressible section 21 after it has been compressed, as shown in FIG. 5. Other means, like for example mechanical clips or holders can also be used.

What is claimed is:

1. A sterile single use measurement device, comprising:
   an elongated measurement probe comprising a first end and a second end,
   a sensing element for measuring a physical property, which is located on said first end of said elongated measurement probe;
   a sterile tubing comprising a first end, a second end and a compressible section located between said ends, said sterile tubing surrounding said elongated measurement probe, such that said second end of said elongated measurement probe extends out of said second end of said sterile tubing;
   means for establishing a sterile connection between said first end of said sterile tubing and a corresponding counter part on a measurement site, wherein said sterile connection forms a passageway leading into a measuring chamber on said measurement site, wherein said physical property is to be measured; and
   a thermal weld providing a sealed mechanical connections between said second end of said sterile tubing and said elongated measurement probe,
   wherein:
   said compressible section of said sterile tubing allows for a length of said sterile tubing to be varied, such that said sensing element is entirely located inside said sterile tubing, when said compressible section is uncompressed, and said sensing element is located outside said first end of said sterile tubing when said compressible section is compressed.

2. The sterile single use measurement device according to claim 1, further comprising:
   means for holding said compressible section in a compressed state after it has been compressed.

3. The sterile single use measurement device according to claim 2, wherein:
   said means for holding said compressible section in a compressed state comprise a retaining fixture, to be attached to an outside of said compressed compressible section.

4. The sterile single use measurement device according to claim 1, wherein:
said compressible section comprises bellows formed into said sterile tubing.

5. The sterile single use measurement device according to claim 1, wherein:
said means for establishing a sterile connection between said first end of said sterile tubing and said corresponding counter part on said measurement site comprise a sterile seal sealing off an inside of said sterile tubing, whilst said sensing element is entirely located inside said sterile tubing before said sterile connection is made.

6. A method of installing a sterile single use measurement device, having: an elongated measurement probe comprising a first end and a second end; a sensing element for measuring a physical property, which is located on said first end of said elongated measurement probe; a sterile tubing comprising a first end, a second end and a compressible section located between said ends, said sterile tubing surrounding said elongated measurement probe, such that said second end of said elongated measurement probe extends out of said second end of said sterile tubing; means for establishing a sterile connection between said first end of said sterile tubing and a corresponding counter part on a measurement site, wherein said sterile connection forms a passageway leading into a measuring chamber on said measurement site, wherein said physical property is to be measured; and a thermal weld providing a sealed mechanical connections between said second end of said sterile tubing and said elongated measurement probe, wherein: said compressible section of said sterile tubing allows for a length of said sterile tubing to be varied, such that said sensing element is entirely located inside said sterile tubing, when said compressible section is uncompressed, and said sensing element is located outside said first end of said sterile tubing when said compressible section is compressed, on said measurement site, comprising the steps of:
mounting the device on the measurement site via the sterile connection; and
transferring the sensing element into the measurement chamber by compressing the compressible section of the sterile tubing.

* * * * *